US006354777B1

(12) United States Patent
Riekki

(10) Patent No.: US 6,354,777 B1
(45) Date of Patent: Mar. 12, 2002

(54) HARNESS FOR MOTORCYCLE LOADING APPARATUS

(76) Inventor: Laurance R. Riekki, Rte. 2, Box 134, Marietta, OK (US) 73448

( * ) Notice: Subject to any disclaimer, the term of this patent is extended or adjusted under 35 U.S.C. 154(b) by 0 days.

(21) Appl. No.: 09/204,126

(22) Filed: Dec. 2, 1998

(51) Int. Cl.[7] ............................. B60P 3/06; B61D 3/18
(52) U.S. Cl. ............................................. 410/3; 410/12
(58) Field of Search ............................. 410/3, 7, 9, 10, 410/11, 12, 23; 414/538; 224/924, 534, 537, 568, 571; 24/68 CD, 265 CD, 302

(56) References Cited

U.S. PATENT DOCUMENTS

| | | | | |
|---|---|---|---|---|
| 199,659 A | * | 1/1878 | Netzner | |
| 477,079 A | * | 6/1892 | Stoddard | |
| 1,386,052 A | | 8/1921 | Duggan | 280/480 |
| 1,591,105 A | | 7/1926 | Rolland | 280/480 |
| 3,428,332 A | * | 2/1969 | McCance | |
| 3,522,892 A | | 8/1970 | Vegors | 414/563 |
| 3,613,918 A | | 10/1971 | Kruschke | 214/75 H |
| 3,740,079 A | | 6/1973 | Skinner | 280/480 |
| 3,785,517 A | | 1/1974 | Brajkovich | 214/450 |
| 3,856,168 A | | 12/1974 | Mauck | 414/478 |
| 3,892,321 A | | 7/1975 | Westbrook, Jr. | 414/563 |
| 4,072,257 A | | 2/1978 | Hall | 224/924 X |
| 4,093,303 A | * | 6/1978 | Nelson | |
| 4,243,243 A | | 1/1981 | Edmisten | 414/462 X |
| 4,361,934 A | * | 12/1982 | Darnell | |
| 4,826,193 A | * | 5/1989 | Davis | |
| 4,932,829 A | | 6/1990 | Miller | 414/480 X |
| 5,145,308 A | | 9/1992 | Vaughn et al. | 414/462 |
| 5,234,307 A | | 8/1993 | Scott | 414/467 |
| 5,366,338 A | | 11/1994 | Mortensen | 414/563 |
| 5,402,557 A | * | 4/1995 | Dalen | |
| 5,456,564 A | | 10/1995 | Bianchini | 414/462 |
| 5,462,398 A | | 10/1995 | Hymer | 414/462 |
| 5,809,620 A | * | 9/1998 | Crowley et al. | |
| 6,032,916 A | * | 3/2000 | Holliday | |
| 6,038,745 A | * | 3/2000 | Rapp | |
| 6,049,950 A | * | 4/2000 | Cavallo | |

FOREIGN PATENT DOCUMENTS

| | | | |
|---|---|---|---|
| FR | 2271068 | 12/1975 | 414/480 |
| NL | 8005580 | 4/1981 | 414/500 |

OTHER PUBLICATIONS

Exhibit A — Drawing of wheel saddle, 1 page, No date.
Exhibits B–D — Photographs of a hanger clip, 1 page, No date.

* cited by examiner

Primary Examiner—Joseph D. Pape
Assistant Examiner—Scott Carpenter
(74) Attorney, Agent, or Firm—McAfee & Taft

(57) ABSTRACT

An apparatus for loading a motorcycle onto another vehicle. The motorcycle loader comprises a wheel saddle positionable on a bed of the vehicle, a yoke assembly connectable to front forks of the motorcycle, an auxiliary winch mounted on the wheel saddle and having a cable connected to the yoke assembly, and a remote control switch for controlling the winch. The remote control may be temporarily clamped nto the handlebars of the motorcycle, and an operator sitting on the motorcycle may energize the auxiliary winch by alternately pressing and releasing a push-button switch on the remote control. The winch thus gradually pulls the front wheel of the motorcycle into the wheel saddle so that the motorcycle can be subsequently tied down to the bed of the vehicle. A strap retainer for retaining a loose end of a strap in the yoke assembly is also provided.

8 Claims, 4 Drawing Sheets

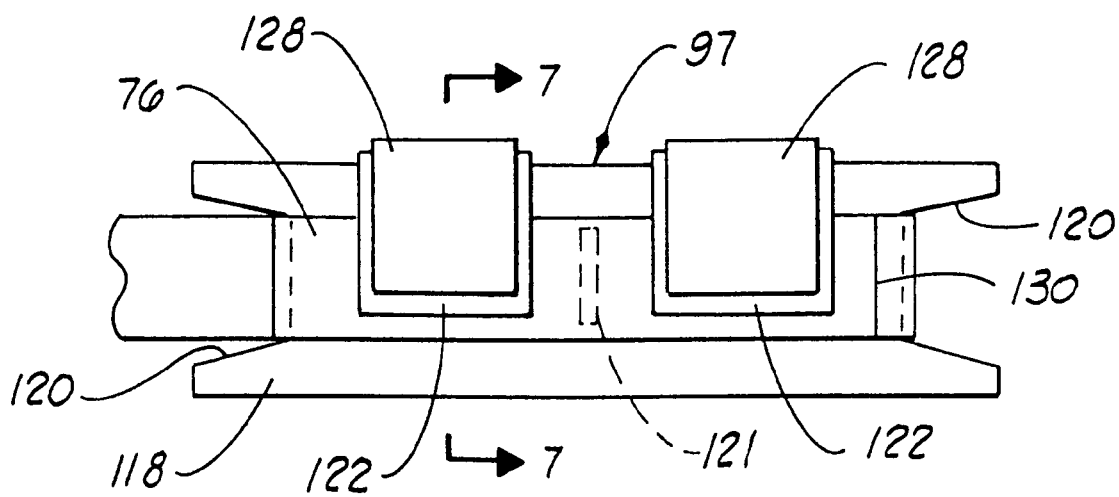
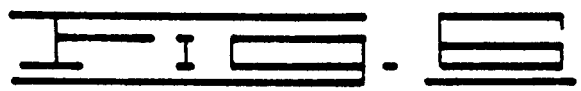
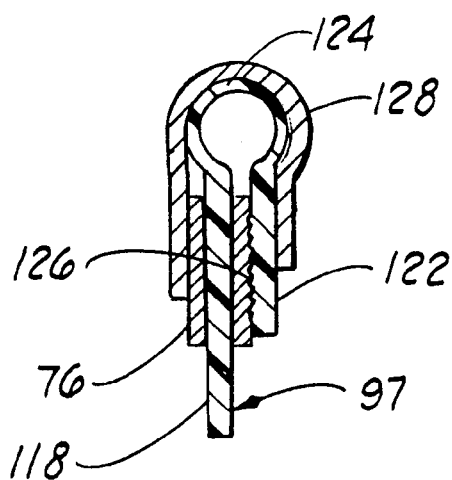
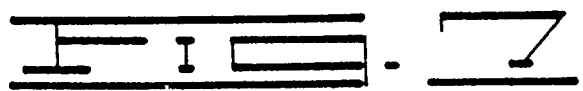

HARNESS FOR MOTORCYCLE LOADING APPARATUS

BACKGROUND OF THE INVENTION

1. Field of the Invention

This invention relates to apparatus for loading a motorcycle onto or into another vehicle, such as onto the flat bed of a tow truck, and more particularly, to a motorcycle loading apparatus which can be used by a single operator to load a motorcycle, including one which is damaged or otherwise inoperable.

2. Description of the Prior Art

There are many occasions when it is necessary or desirable to load a motorcycle onto another vehicle. For example, motorcycles are frequently loaded onto trailers, singly or with other motorcycles, for transportation to another location. Another frequent application of motorcycle loading is when the motorcycle has become inoperable or has been damaged, such as in an accident, and it must be loaded onto a towing vehicle. Still another application is when a vehicle is impounded.

In the past, motorcycles have been loaded in a variety of ways. First of all, an operable motorcycle can be simply ridden onto the vehicle on which it is to be loaded if a ramp is available or if the bed of the trailer or truck itself can be tilted so that it engages the ground. However, loading a motorcycle by riding it onto another vehicle may be impossible if the motorcycle is damaged, and even if the motorcycle is not damaged, if the person is not trained in riding motorcycles. Also, once the motorcycle is actually loaded, assistance is required to attach tie-down straps to the motorcycle to hold it in place for transportation.

One prior art apparatus used to make it easier to load and position a motorcycle onto a flat bed of a truck includes a wheel saddle having a pivotal rear member. The wheel saddle is held in place on the bed of the truck by the main winch on the truck, and the front wheel of the motorcycle is maneuvered to engage the pivoted rear member. As the motorcycle front wheel is moved forwardly, the pivoting member pivots. The forward part of the motorcycle front wheel eventually engages an upwardly extending rail portion, and another rail portion on the pivoting member pivots upwardly so that it engages a rear portion of the motorcycle front wheel to hold the wheel in place. With this device, it is necessary for a trained motorcycle rider to ride the motorcycle into the saddle which may be difficult or impossible to do if the motorcycle is not operable or is damaged. Also, motorcycle owners may not leave the keys, and some wrecker operators will not start the motorcycle as a matter of policy, so, it is usually necessary to have assistance to push the motorcycle into position.

Accordingly, there is a need for an apparatus which can be used to load a motorcycle onto another vehicle by a single operator, even if the motorcycle is damaged or is not operable. The present invention meets this need by providing means for pulling the motorcycle into the wheel saddle of the prior art and which may be operated by remote control by a person sitting on the motorcycle. It is not necessary for the motorcycle to be operable or undamaged to utilize this system. Also, the present invention may be operated by a person who is not skilled in riding motorcycles. All that is necessary is for the operator to balance the motorcycle as it is being pulled into place.

SUMMARY OF THE INVENTION

The motorcycle loading apparatus of the present invention is adapted to load a motorcycle easily and quickly onto another vehicle by a single operator, regardless of whether the motorcycle is operable or damaged. The apparatus is portable and relatively lightweight.

The motorcycle loading apparatus of the present invention comprises a wheel saddle positionable on the bed of the vehicle and adapted for receiving a wheel of the motorcycle therein, yoke or harness means for attaching to the motorcycle, and winch means disposed on the saddle and connectable to the yoke means for pulling the motorcycle such that the wheel is positioned in the saddle.

The yoke means is preferably characterized by a yoke or harness assembly comprising a strap for connection to a member of the motorcycle, and a spreader such that portions of the strap may be disposed on opposite sides of the front wheel of the motorcycle. The member may be a fork, frame, footpeg, or other portion of the motorcycle. The strap is adjustable in length and may include first and second straps so that the harness may be said to comprise a first strap engagable with a first fork or first member of the motorcycle, a second strap engagable with a second fork or second member of the motorcycle, and a spreader engaged with at least one of the first and second straps to maintain at least a portion of the straps in spaced relationship to one another.

In a preferred embodiment, the harness further comprises a first hook attached to the first strap at an intermediate location thereon, a first ring attached to an end of the first strap, a second hook attached to the second strap at an intermediate location thereon, and a second ring attached to an end of the second strap. The first strap may be wrapped around the first member of the motorcycle, and the first ring may be engaged with the first hook. The second strap may be wrapped around the second member of the motorcycle, and the second ring may be engaged with the second hook.

The wheel saddle comprises a lower track, a front stop extending upwardly from said lower track, and a bracket extending from said front stop. The winch means is attached to the bracket.

The winch means, which also may be referred to as a means for applying tension to the yoke or harness means, is characterized in the preferred embodiment by an electric winch having a cable engagable with the yoke means.

The apparatus may further comprise remote control means attachable to the motorcycle for controlling the winch means wherein the remote control means is operable by an operator sitting on the motorcycle. The remote control means preferably comprises a clamp for attachment to a portion of the motorcycle, such as the handlebar, and a switch mounted on the clamp. The switch is a push-button switch which makes the electrical connection when depressed and breaks the electrical connection when released. The clamp has a biasing means for biasing it to a clamping position.

The apparatus additionally comprises retaining means for retaining a loose end of a strap on the yoke or harness assembly. This retainer means is preferably characterized by a retainer assembly comprising a spool portion, a jaw portion hingingly connected to the spool portion and having an open position wherein the strap may be wrapped around the spool portion and a closed position for grippingly engaging a portion of the strap wrapped around the spool portion, and a clip for locking the jaw portion in the closed position thereof. A plurality of teeth are defined on a surface of the jaw portion facing the strap and are adapted for engaging the portion of the strap when the jaw portion is in the closed position thereof. A notch is defined in longitudinal ends of the spool portion, and the jaw portion and spool portion are preferably integrally formed. The retainer assembly is usable in other applications in addition to retaining a portion of a strap in a motorcycle loading apparatus.

Numerous objects and advantages of the invention will become apparent as the following detailed description of the preferred embodiment is read in conjunction with the drawings which illustrate such embodiment.

BRIEF DESCRIPTION OF THE DRAWINGS

FIG. 6 illustrates a strap retaining device used in the motorcycle loading apparatus.

FIG. 7 is a cross section taken along lines 7—7 in FIG. 6.

DESCRIPTION OF THE PREFERRED EMBODIMENT

Figure 1:
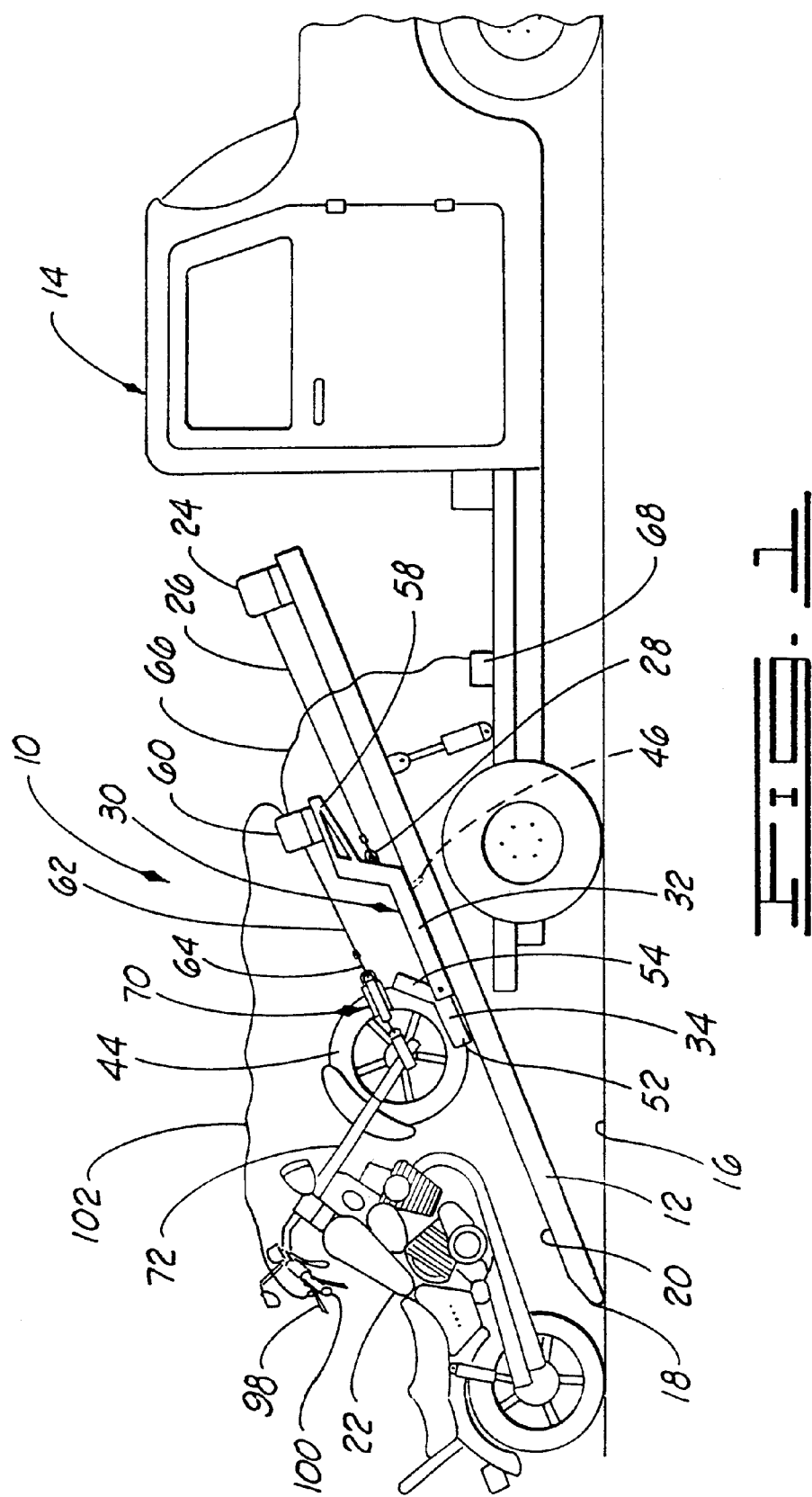
FIG. 1 shows the motorcycle loading apparatus of the present invention as positioned on the bed of a flat bed tow truck and also illustrates a motorcycle being loaded onto the apparatus.

Referring now to the drawings, and more particularly to FIG. 1, the motorcycle loading apparatus of the present invention is shown and generally designated by the numeral 10. Apparatus 10 is adapted for use in loading a motorcycle onto a surface of another vehicle, such as bed 12 of a flat bed tow truck 14. Tow truck 14 is of a kind known in the art and operates such that bed 12 thereof may be tilted and rolled back until it engages a ground surface 16 at a rearward end 18 of the bed as seen in FIG. 1.

The illustrated tow truck 14 has a substantially flat bed surface 20 of bed 12 which is normally adapted for receiving a car or the like. Use of apparatus 10 enables the truck to be used to load a motorcycle 22 on bed surface 20.

In conjunction with a ramp, apparatus 10 could also be used to load a motorcycle into a van, pickup, or other type of vehicle as well.

At the forward end of bed 12 of tow truck 14 is a main winch 24 of a kind known in the art. Winch 24 includes a cable 26 with a hook 28 on an end thereof. Hook 28 is adapted for engagement with anything that needs to be pulled onto bed 12 which is normally a car. In most cases, main winch 24 is a powered device which allows the car to be pulled onto the bed. As will be further described herein, main winch 24 is used to hold a portion of apparatus 10 in place, but the main winch is not used to move motorcycle 22 directly.

Figure 2:
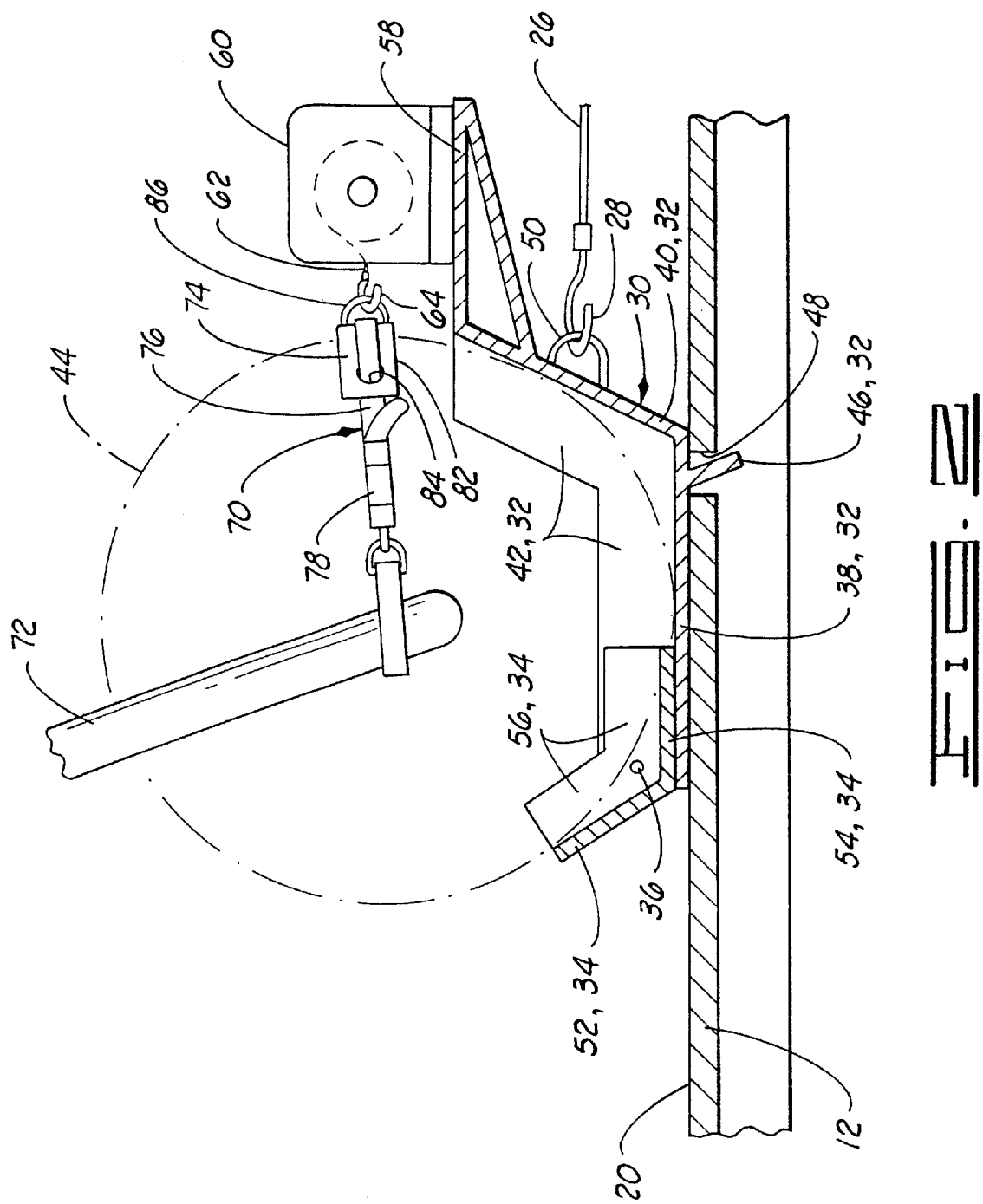
FIG. 2 shows a partial vertical cross section and side elevational view of the apparatus with a motorcycle wheel in a loaded position.
Figure 3:
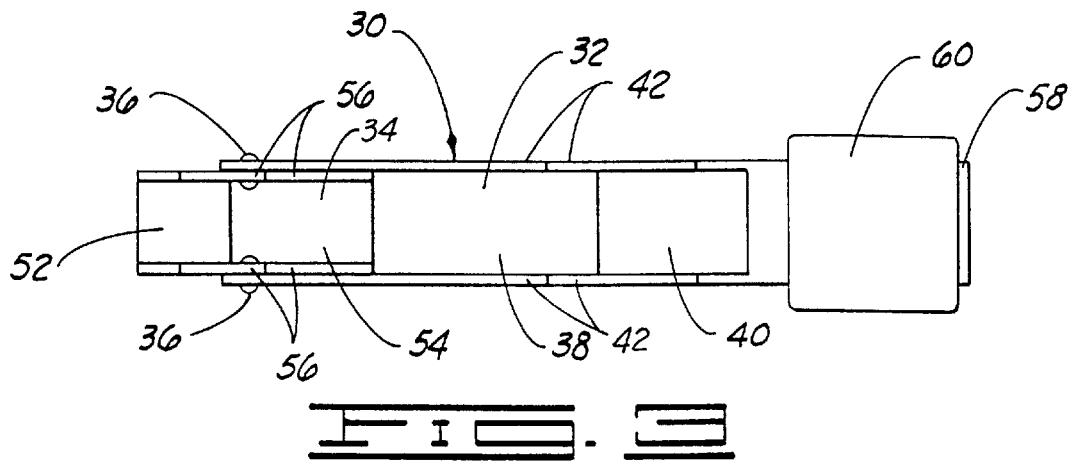
FIG. 3 shows a plan view of a wheel saddle portion of the apparatus.

Referring also to FIG. 2, motorcycle loading apparatus 10 comprises a wheel saddle assembly 30, generally just referred to as wheel saddle 30. Wheel saddle 30 includes a forward portion 32 with a rearward portion 34 connected thereto by a pivot 36. That is, rearward portion 34 is adapted to pivot with respect to forward portion 32 of wheel saddle 30.

Forward portion 32 includes a lower track 38 which is adapted for substantially flat engagement with bed surface 20 of tow truck bed 12. Extending upwardly and forwardly from lower track 38 is a front stop or track 40. A pair of side walls 42 extend along both sides of lower track 38 and both sides of front stop 40. It will thus be seen that a track is formed into which a front wheel 44 of motorcycle 22 may be positioned, as will be further described herein. Side walls 42 prevent side-to-side movement of front wheel 44 when it is positioned in forward portion 32 of wheel saddle 30.

Forward portion 32 of wheel saddle 30 also includes a downwardly and slightly forwardly extending tab 46 which is attached to, or integral with, lower track 38. Tab 46 is adapted to fit in a slot 48 cut into bed 12 of tow truck 14. Slot 48 is the only modification of tow truck 14 which is necessary to use apparatus 10. Slot 48 is normally centered transversely on bed 12. However, additional slots may be spaced transversely from centered slot 48 to allow off-center positioning of wheel saddle 30 to accommodate a motorcycle with a sidecar or the use of a plurality of wheel saddles 30 to accommodate multiple motorcycles.

Forward portion 32 of wheel saddle 30 further includes a D-ring 50 attached to the front side of front stop 40.

Rearward portion 34 of wheel saddle 30 includes a first track 52 and a second track 54 which extend angularly from one another. Pivot 36 connects rearward portion 34 to forward portion 32 at an intermediate position on the rearward portion between first and second tracks 52 and 54. Extending along both first and second tracks 52 and 54 are a pair of side walls 56 which act to prevent side movement of motorcycle front wheel 44 in a manner similar to side walls 42 of forward portion 32.

When wheel saddle 30 is in a loading position, as shown in FIG. 1, rearward portion 34 is pivoted rearwardly with respect to forward portion 32 such that first track 52 is positioned generally flat along bed surface 20, and second track 54 extends forwardly and upwardly from the first track. As motorcycle front wheel 44 is moved into first track 52 between side walls 56, it will be seen by those skilled in the art that further forward movement of the front wheel of the motorcycle will bring it into engagement with second track 52 and cause rearward portion 34 to be pivoted forwardly (or clockwise as shown in FIGS. 1 and 2) until it reaches the loaded position shown in FIG. 2. In this loaded position, front wheel 44 of motorcycle 22 is thus located between first track 52 which now extends upwardly and front stop 40, in addition to being disposed between facing side walls 42 and facing side walls 56. Preferably, motorcycle 22 just clears rearward end 18 of bed 12.

Wheel saddle 30 as just described is admitted prior art and has been previously developed and sold by the inventor of the present invention.

Apparatus 10 of the present invention includes a modification of wheel saddle 30 from that of the prior art. In apparatus 10, a bracket 58 is attached to the upper forward end of front stop 40 of forward portion 32. Bracket 58 extends in a plane substantially parallel with lower track 38. Bracket 58 may be attached to front stop 40 in any manner known in the art. For example, bracket 58 may be temporarily attached by bolts or permanently attached by welding.

A winch 60 is attached to bracket 58. Winch 60 may also be referred to as an auxiliary winch 60 since it is used in addition to main winch 24 which is part of tow truck 14. Auxiliary winch 60 also includes a cable 62 with a hook 64 on an end thereof. Auxiliary winch 60 has a power cable 66 adapted for connection to a power supply or connection 68 on tow truck 14. Power supply 68 is shown schematically in FIG. 1 and may include the battery and electric system of tow truck 14 to which any power cable, such as power cable 66, may be connected in a manner known in the art. A portable power supply could also be used. Auxiliary winch 60 may thus be a powered winch.

The next main component of motorcycle loading apparatus 10 which will be discussed is a harness or yoke assembly 70 which is adapted for connection to front forks 72 or other members of motorcycle 22. See FIGS. 1, 2 and 4. As will be further described herein, by connecting hook 64 on cable 62 of auxiliary winch 60 to yoke assembly 70, motorcycle 22 may be pulled into engagement with wheel saddle 30.

Yoke assembly 60 includes a spreader 74, a first strap 76 and a second strap 78. First and second straps 76 and 78 are preferably made of a flexible material. Spreader 74 is preferably made of a more rigid material, such as metal.

Figure 4:
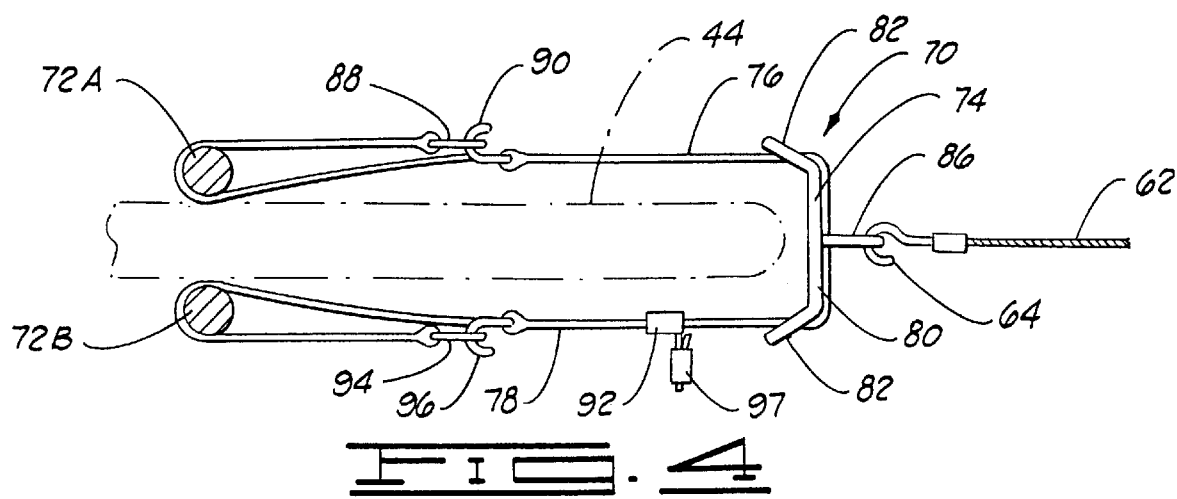
FIG. 4 shows a plan view of a yoke portion engaged with forks of a motorcycle front wheel.

As best seen in FIG. 4, spreader 74 includes a central portion 80 with an end portion 82 extending angularly therefrom at each end of central portion 80. As seen in FIG. 2, each end portion 82 defines a hole 84 therein.

A D-ring 86 is attached to central portion 80 and extends forwardly therefrom.

First strap 76 is positioned through holes 84 and end portions 82 of spreader 74 and also through D-ring 86 so that the first strap wraps around most of the outer portion of spreader 74, as best seen in FIGS. 2 and 4. At one end of first strap 76 is a ring 88. In operation, first strap 76 is wrapped around fork 72A of motorcycle 22, as seen in FIG. 4, and ring 88 is engaged with a hook 90 attached at an intermediate location on first strap 76. An opposite end of first strap 76 is connected to an end of second strap 78 by a strap connector 92.

The other end of second strap 80 has a ring 94 thereon. Second strap 78 is wrapped around another fork 72B of motorcycle 22 and engaged with a hook 96 attached to an intermediate location on second strap 78.

First and second straps 76 and 78 are attached to one another by strap connector 92, the first and second straps essentially act as a single strap, the overall length of which may be adjusted by the positioning of strap connector 92. Preferably, the combined lengths of first and second straps 76 and 78 are adjusted so that spreader 74 is positioned in front of front wheel 44 of motorcycle 22. Yoke assembly 70 may thus be adjusted to fit any size wheel of a motorcycle.

Any loose ends of first strap 76 or second strap 78 may be wrapped around and retained by a strap retainer 97. The details of strap retainer 97 will be further discussed herein.

Hook 64 on cable 62 of auxiliary winch 60 is connected to D-ring 86 on central portion 80 of yoke assembly 70. As tension is applied to cable 62 by auxiliary winch 60, it will be seen that first and second straps 78 of yoke assembly 70 are also placed in tension. By the engagement of rings 88 and 94 with hooks 90 and 96, respectively, it will thus be seen that the load may be applied to forks 72A and 72B by auxiliary winch 60.

Control of auxiliary winch 60 is provided by a remote switch assembly 98 which is adapted for temporary attachment to a handlebar 100 of motorcycle 22, as seen in FIG. 1. Remote switch assembly 98 is connected to auxiliary winch 60 by an electric cable 102.

Figure 5:
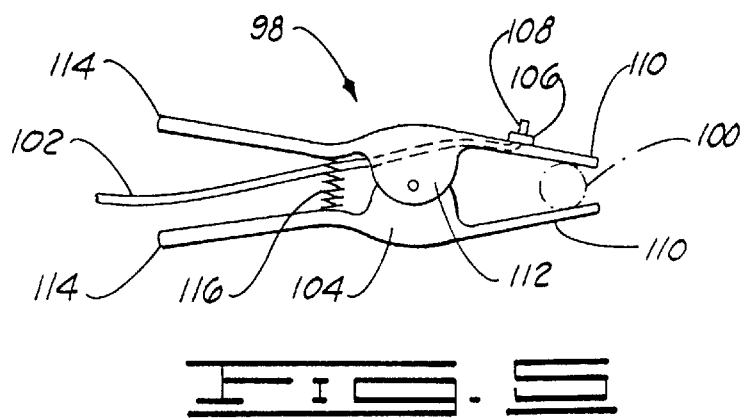
FIG. 5 illustrates a side view of a remote control switch.

Referring now to FIG. 5, the details of remote switch assembly 98 are shown. Remote switch assembly 98 includes a spring loaded clamp portion 104 with an electrical switch 106 attached thereto. Electric switch 106 is preferably a push button type having a button 108 thereon. In the preferred embodiment, switch 106 is closed (makes an electrical connection) when button 108 is depressed and is open (breaks the electrical connection) when button 108 is released.

Clamp portion 104 includes a pair of clamping bars 110 which extend from a central pivot portion 112. A pair of handles 114 extend in an opposite direction from pivot portion 112. A biasing means, such as spring 116, is provided for biasing handles 114 apart and clamping bars 110 toward one another to a clamping position. Thus, by squeezing on handles 114, clamping bars 110 are separated so that they may be positioned over handlebar 100. When handles 114 are released, biasing means 116 moves clamping bars 110 into clamping engagement with handlebar 100. Thus, electrical switch 106 may be quickly and temporarily attached to motorcycle 22. When so positioned, the operator can actuate switch 106 with his or her thumb while keeping his or her hands on handlebars 100, thus providing control of auxiliary winch 60 and the motorcycle.

Referring now to FIGS. 6 and 7, details of strap retainer 97 will be discussed. Strap retainer 97 includes a spool portion 118 having a pair of notches 120 formed in opposite longitudinal ends thereof and a slot 121 between the notches.

A pair of jaw portions 122 are connected to spool portion 118 by hinge portions 124. Preferably, spool portion 118, jaw portions 122 and hinge portions 124 are integrally formed such as by molding them as a single plastic component with hinge portions 124 being relatively thin so that they may flex easily to open and close jaw portions 122 relative to spool portion 118. However, the invention is not intended to be limited to plastic construction.

A free end of a strap, such as first strap 76, may be inserted into slot 121 and then the strap may be wrapped around spool portion 118 such that the strap wraps through notches 120, as best seen in FIG. 6. During this wrapping, jaw portions 122 are pivoted away from spool portion 118 to an open position. When the wrapping is completed, jaw portions 122 may be pivoted to a closed position so that they engage first strap 76 as best seen in FIG. 7. Teeth 126 may be provided on jaw portions 122 to help the jaw portions grippingly engage the strap. A spring clip 128 is snapped over the strap, jaw portion 122 and hinge portion 124 to hold the jaw portions in their closed positions in gripping engagement with the strap, as best seen in FIG. 7.

Thus, by using strap retainer 97, no long portions of first strap 76 will be loose, but rather only a short controlled end 130 of strap 76 will be left. In this way, the strap cannot become entangled with motorcycle 22 or any other portions of apparatus 10.

Operation Of The Invention

A description of the operation of motorcycle loading apparatus 10 now follows. Only a single operator is necessary.

The operator of tow truck 14 actuates the necessary controls on the tow truck to tilt bed 12 into the loading position shown in FIG. 1.

Wheel saddle assembly 30 is positioned on bed surface 20 such that tab 46 extends into slot 48. Cable 26 of main winch 24 is extended so that hook 28 on cable 26 may be engaged with D-ring 50 of wheel saddle 30. Main winch 24 is then actuated to apply tension to cable 26 which pulls wheel saddle assembly 30 forwardly with respect to the tow truck such that tab 46 is lockingly engaged with the forward side of slot 48. Since tab 46 angles forwardly, upward forces on wheel saddle 30 will not result in disengagement thereof with bed surface 20. In other words, wheel saddle 30 is locked in place.

Next, rearward portion 34 of wheel saddle 30 is pivoted rearwardly to the loading position shown in FIG. 1. Yoke assembly 70 is connected to forks 72, an electrical connection is made between auxiliary winch 60 and power supply 68 by power cable 66, and remote switch assembly 98 is clampingly engaged with handlebar 100 of motorcycle 22, all as previously described. Also, cable 62 is extended from auxiliary winch 60 so that hook 64 at the end of cable 62 may be engaged with D-ring 86 of yoke assembly 70. The actual order of the steps described in this paragraph is not critical.

The operator manually positions motorcycle 22 adjacent to rear end 18 of bed 12. Ordinarily, this is most easily accomplished by the operator sitting on the motorcycle so that it is easily balanced. Button 108 on switch 106 is depressed to energize winch 60 so that cable 64 is retracted into the auxiliary winch. As will be understood by those skilled in the art, tension is thus applied to cable 62 and to yoke assembly 70 which causes motorcycle 22 to be pulled forwardly by forks 72 toward tow truck 14. By proper positioning of remote switch assembly 98, the actuation of button 18 may be accomplished with the operator's hands still on handlebars 100 of motorcycle 22. Thus, it is easy for the operator to maintain complete control over the motorcycle and to control forward movement thereof by depressing and releasing button 108 as necessary, thus energizing and de-energizing auxiliary winch 60. Motorcycle 22 is thus moved gradually forwardly so that its front wheel 44 engages rearward portion 34 of wheel saddle 30, and further forward movement of the motorcycle will result in rearward portion 34 being pivoted forwardly so that front wheel 44 of the motorcycle is brought into the loaded position shown in FIG. 2.

At this point, the operator can put down the kick stand on the motorcycle to support the motorcycle on bed surface 20. The combination of the use of the kick stand with the tension still in cable 62 allows the operator to dismount the motorcycle and still leave it in position.

At this point, the operator can then attach normal tie-down straps (not shown) to securely attach the motorcycle to bed 12. The use of such tie-down straps is well known in the art and will not be elaborated upon here. After the motorcycle has been thus secured, the kick stand on the motorcycle may be raised so that it cannot slip on bed 12.

Auxiliary winch 60 can be locked in position to keep tension on cable 62 to add further security to tying down motorcycle 22. Bed 12 can then be tilted back to its horizontal traveling position so that motorcycle 22 may be transported on truck 14 to the desired location.

Unloading of the motorcycle is carried out by substantially reversing the above-described loading steps.

It will be seen, therefore, that the motorcycle loading apparatus of the present invention is well adapted to carry out the ends and advantages mentioned, as well as those inherent therein. While a presently preferred embodiment of the apparatus has been described for the purposes of this disclosure, numerous changes in the arrangement and construction of parts may be made by those skilled in the art. All such changes are encompassed within the scope and spirit of the appended claims.

What is claimed is:

1. A harness for attaching to first and second members of a motorcycle, said harness comprising:

a first strap engagable with the first member of the motorcycle;

a second strap engagable with the second member of the motorcycle;

a spreader engaged with at least one of the straps to maintain at least portions of the straps in spaced relationship to one another;

a first hook attached to said first strap at an intermediate location thereon;

a first ring attached to an end of said first strap, wherein said first strap may be wrapped around the first member of the motorcycle and said first ring engaged with said first hook;

a second hook attached to said second strap at an intermediate location thereon; and a second ring attached to an end of said second strap, wherein said second strap may be wrapped around the second member of the motorcycle and said second ring engaged with said second hook.

2. The apparatus of claim 1 further comprising a connector for adjustably connecting said first and second straps.

3. The apparatus of claim 1 wherein said spreader has a central portion with a pair of end portions extending angularly therefrom, each of said end portions defining a hole therethrough adapted for receiving a part of one of said first and second straps.

4. The apparatus of claim 1 wherein said spreader is relatively less flexible than said first and second straps.

5. A harness for attaching to first and second members of a motorcycle, said harness comprising:

a first strap engagable with the first member of the motorcycle;

a second strap engagable with the second member of the motorcycle, at least one of said first and second straps having a free end;

a spreader engaged with at least one of said straps to maintain at least portions of said straps in spaced relationship to one another; and a retainer for said free end of said one strap, said retainer comprising:

a spool portion;

a jaw portion hingingly connected to said spool portion and having an open position wherein said one strap may be wrapped around said spool portion and a closed position for grippingly engaging a portion of said one strap wrapped around said spool portion; and a clip for locking said jaw portion in said closed position thereof.

6. The harness of claim 5 wherein said retainer further comprises a plurality of teeth defined on a surface of said jaw portion facing said one strap and engaging said portion of said one strap when said jaw portion is in said closed position thereof.

7. The harness of claim 5 wherein said retainer further comprises a notch defined in longitudinal ends of said spool portion.

8. The harness of claim 5 wherein said jaw portion and said spool portion of said retainer are integrally formed.

* * * * *